United States Patent Office 3,549,772
Patented Dec. 22, 1970

3,549,772
METHODS FOR LOWERING SERUM CHOLESTEROL IN MAMMALS USING CYCLOHEXYLIDENE-BIS(ALKYLPHENOL) COMPOUNDS
James W. Barnhart, Indianapolis, Ind., assignor to The Dow Chemical Company, Midland, Mich., a corporation of Delaware
No Drawing. Filed July 26, 1967, Ser. No. 656,044
Int. Cl. A61k 27/00
U.S. Cl. 424—346                        4 Claims

ABSTRACT OF THE DISCLOSURE

Methods useful for lowering serum chloresterol in mammals comprising administration to the animal of a hypocholesteremic amount of a cyclohexylidenebis(alkylphenol) compounds, and compositions to be employed in practicing the method.

---

This invention relates to novel compositions and a method for using the same for reducing the concentration of cholesterol in the blood of mammals. More particularly, the invention is directed to novel compositions and methods for using the same to reduce cholesterol levels in the blood of mammals wherein the compositions contain a hypocholesteremic amount of a 4,4'-cyclohexylidene(alkylphenol) compound.

It is an object of this invention to provide a novel method and novel compositions which have the effect of lowering blood cholesterol upon the administration of such compositions to mammals. A further object of this invention is to provide novel compositions which are useful for lowering abnormally high blood serum cholesterol levels and which have low toxicity and little or no pharmacological effects in other areas at dosage levels consistent with good hypocholesteremic or cholesterol-lowering activity. It is a further object of this invention to provide novel compositions which have the effect of lowering blood cholesterol in mammals and which exert no estrogenic effect at dosage levels consistent with good hypocholesteremic activity. A further object of the invention is to provide a method and compositions useful for the alleviation of hypercholesteremia in mammals.

It has been found that the serum cholesterol level of mammals may be lowered by administering to the animal a hypocholesteremic amount of a 4,4'-cyclohexylidenebis-(alkylphenol) compound corresponding to the formula:

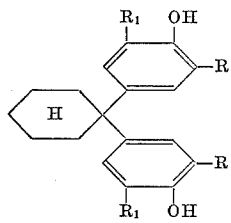

In the present specification and claims, R represents hydrogen or methyl and $R_1$ represents a secondary alkyl, tertiary alkyl or cycloalkyl group containing from 3, to 4, to 5 carbon atoms.

The compounds are crystalline solids which are soluble in a variety of organic solvents such as alcohol, acetone and benzene and only slightly soluble in water. They can be prepared by known methods for the preparation of cycloalkylidenebisphenols.

For the sake of convenience, compounds having the above-described chemical structures will be referred to hereinafter as cyclohexylidenebisphenols.

It has been found that the cyclohexylidenebisphenols, when administered to mammals in accordance with the method of the invention, have the effect of lowering the serum chloresterol content, that is, the amount of cholesterol in the blood serum of the mammal to which is administered the active ingredients of the invention. Thus, the method and composition of the invention are useful for studying the sterol metabolism of animals and for the alleviation of hyperchoesteremia in mammals. The cyclohexylidenebisphenols are preferably administered internally as compositions in dosage unit form. Such compositions can be prepared by known techniques, for example, tableting or encapsulation. The dosage units preferably contain from about 200 milligrams to about 5 grams of one of the active compounds. The compounds can also be administered as nutritive compositions adapted to be fed as part or all of the animal diet.

In forming the compositions of the invention, the active cyclohexylidenebisphenols are incorporated in a non-toxic carrier. In the present specification and claims, the term "non-toxic carrier" refers to known pharmaceutical or veterinary excipients which are substantially non-toxic and non-sensitizing at dosages consistent with good hypocholesteremic activity.

Suitable solid non-toxic carriers which can be employed for formulating compositions of the invention in tablet form can include, for example, solid inert diluents such as calcium carbonate, sodium carbonate, lactose, glucose, calcium phosphate or sodium phosphate; granulating and disintegrating agents such as corn starch or alginic acid; binding agents such as starch, gelatin or gum acacia; and lubricating agents such as magnesium stearate, stearic acid or talc. The tablets can be uncoated or they can be coated by known techniques to delay disintegration or absorption in the gastrointestinal tract and thereby provide sustained action over a prolonged period. Tablets for maintaining prolonged effects can contain the active compound embedded in a waxy core around which is compressed a granulated mixture of the active compound together with a non-toxic carrier.

Other formulations for oral use can also be prepared as hard or soft gelatin capsules wherein the cyclohexylidenebisphenol is mixed with an inert solid diluent such as calcium carbonate, calcium phosphate or kaolin or an inert oily medium such as olive oil or liquid paraffin. The mixtures can then be filled into gelatin capsules by conventional procedures.

Liquid compositions can also be formulated by dissolving or suspending the active compound in non-toxic liquid carriers, for example, a vegetable oil such as olive oil, peanut oil or cocoanut oil, a mineral oil, glucose syrup, syrup of acacia, ethanol, polyethylene glycols, glycerine, water, saline and the like, and the said composition can contain a thickening agent such as beeswax or cetyl alcohol. The liquid compositions can be administered orally as syrups, elixirs or the like. Suitable liquid compositions can also be formulated as sterile injectable compositions.

Aqueous suspensions can contain the active cyclohexylidenebisphenols in admixture with suspending agents, dispersing agents, wetting agents and the like known to be suitable in the manufacture of aqueous suspensions. Suitable non-toxic carriers can be, for example, a suspending agent such as methyl cellulose, hydroxypropylmethyl cellulose, sodium alginate, gum tragacanth or gum acacia and the like and compatible mixtures thereof. Dispersing or wetting agents can include lecithin, polyoxyethylene stearate, condensation products of ethylene oxide with esters derived from fatty acids and hexitol anhydrides such as polyoxyethylene sorbitan monooleate or other like excipients. Dispersible powders and granules suitable for preparation of an aqueous suspension by the addition of water contain the cyclohexylidenebisphenol in admixture with a dispersing or wetting agent, suspending agent or the like.

The compositions of the invention can also be in the form of water-in-oil or oil-in-water emulsions. Such emulsions can include such carriers as corn oil, olive oil, arachis oil, emulsifying agents such as gum acacia, gum tragacanth, lecithin, sorbitan monooleate and the like and compatible mixtures thereof.

The compositions described above can also contain, in addition, sweetening agents such as sugar, saccharin or sodium cyclamate, flavoring agents such as caramel, preservatives such as ethyl p-hydroxybenzoate, antioxidants such as ascorbic acid and suitable coloring materials. The compositions generally contain from 20 to about 95 percent, and preferably from about 50 to 95 percent of the active cyclohexylidenebisphenol. The solid compositions such as tablets and capsules contain from about 50 to about 95 percent of the active compounds. The liquid compositions contain from about 20 to 60 percent of the cyclohexylidenebisphenol.

The active compounds can also be prepared in the form of a nutritive composition in which the active ingredient is mixed with vitamins, fats, proteins or carbohydrates and the like or mixtures thereof. The nutritive compositions are adapted to be administered as the total diet, as a part of the diet or as a supplement to the diet. The active cyclohexylidenebisphenol compounds can also be formulated as concentrated compositions which are adapted to be diluted by admixture with liquid or solid foodstuffs. The concentrated compositions are prepared by mechanically milling or otherwise mixing the active ingredient with an inert carrier such as silica gel, soluble casein, starch or the like or mixtures thereof. The concentrated compositions can also include additional ingredients such as vitamins, minerals, proteins and the like.

The hypocholesteremic amount of the cyclohexylidenebisphenol compounds to be administered to a mammal, that is, the amount which is effective to lower the serum cholesterol level appreciably, can vary depending upon such factors as the size, weight and age of the animal treated, the particular compound employed, the desired serum cholesterol level to be obtained, whether or not the animal is hypercholesteremic, the period of administration and the method of administration. In general, cyclohexylidenebisphenols are administered in daily dosages of between about 20 milligrams and about one gram of the active compound per kilogram of body weight of the mammal to be treated. A daily dosage of between about 40 and about 400 milligrams of active compound per kilogram of animal body weight is preferred.

The following examples illustrate the present invention but are not to be construed as limiting the same.

EXAMPLE 1

One part of 4,4'-cyclohexylidenebis(2 - tert - butyl-6-methylphenol) was dissolved in 4 parts of acetone and the solution was mixed with 3 parts of silica gel to adsorb the 4,4'-cyclohexylidenebis(2 - tert-butyl-6-methylphenol) on the silica gel. The mixture was dried to obtain a concentrated composition containing 25 percent of the active compound.

In substantially the same procedure, one part of 4,4'-cyclohexylidenebis(2-sec-butylphenol) was adsorbed on 3 parts of silica gel and dried to obtain a concentrated composition.

In substantially the same procedure, a concentrated composition was obtained by mixing together one part of 4,4'-cyclohexylidenebis(2-cyclopentylphenol), 4 parts of acetone and 3 parts of silica gel and removing the acetone by drying.

EXAMPLE 2

Each of the concentrated compositions of Example 1 was employed to prepare separate nutritive compositions by intimately mixing 0.5 part of a concentrated composition of Example 1 with 99.5 parts of standard animal feed on a conventional roller mill. There were thus obtained separate nutritive compositions suitable for oral administration to mammals for the purpose of lowering serum cholesterol levels. The compositions were adapted to be fed as the entire diet.

EXAMPLE 3

A feed composition consisting of balanced rodent feed was mixed together with various amounts of a cyclohexylidenebisphenol compound to prepare several separate nutritive compositions each containing 0.125 percent of one of the cyclohexylidenebisphenol compounds. Separate groups of six male mice were fed for two weeks on separate diets consisting of one of the above-described compositions. For purposes of comparison, other groups of mice were similarly fed on diets containing 0.125 percent of a known bisalkylphenol compound. Separate groups of mice were fed for two weeks on a similar diet which contained no cyclohexylidenebisphenol to serve as a check. At the end of the two week period, the mice were exsanguinated under ether anesthesia. Serum chloesterol was determined by taking a 0.05 milliliter aliquot of blood serum from each mouse and adding the aliquot to 3 milliliters of a 0.08 percent solution of ferric chloride in pure acetic acid. The serum was mixed with the ferric chloride-acetic acid solution and allowed to stand for 10 to 15 minutes to flocculate protein. The protein was precipitated by centrifugation and the clear supernatant was transferred to a stoppered test tube. Two milliliters of sulfuric acid were added to the supernatant and mixed well. The tubes were then left to stand exposed to air for 20 to 30 minutes. Serum cholesterol was determined by measuring percent transmission at a wave length of 560 millimicrons in a spectrophotometer and comparing the percent transmission to that observed with solutions containing known amounts of cholesterol. The serum cholesterol level found in the check groups of mice was used as the basis for calculating perecntage reduction of cholesterol. The percentage reduction of cholesterol for the particular compounds employed is set out in the following table.

TABLE I

| Compound: | Percent reduction of serum cholesterol |
|---|---|
| 4,4'-cyclohexylidenebis(2-isopropylphenol) | 16 |
| 4,4'-cyclohexylidenebis(2-sec-butylphenol) | 28 |
| 4,4'-cyclohexylidenebis(2-tert-butyl-6-methylphenol) | 36 |
| 4,4'-cyclohexylidenebis(2-cyclopentylphenol) | 16 |
| 4,4'-cyclohexylidenebis(2-cyclohexylphenol) | 0 |
| 4,4'-isopropylidenebis(2-isopropylphenol) | 0 |
| 4,4'-isopropylidenebis(2-sec-butyl-phenol) | 0 |
| 4,4'-(1-methylbutylidene)bis(2-cyclopentylphenol) | 0 |

EXAMPLE 4

Fifty parts of 4,4' - cyclohexylidenebis(2 - tert-butylphenol) are intimately mixed with 2 parts of ascorbic acid and 48 parts of corn starch on conventional mixing apparatus. The mixture is then filled into gelatin capsules in the amount of one gram per capsule and the capsules are administered to mammals.

95 parts of 4,4' - cyclohexylidenebis(2 - tert-butyl-6-methylphenol), 0.75 part of pyridoxine hydrochloride, 19.25 parts of ascorbic acid and 85 parts of 4,4'-cyclohexylidenebis(2-cyclopentylphenol) are intimately mixed together. The mixture is then mixed well with 75 parts of milk sugar and 225 parts of corn starch and filled into gelatin capsules in the amount of 1.5 grams per capsule. The capsules are suitable for oral administration to mammals.

EXAMPLE 5

25 milliliters of ethanol are diluted with 75 milliliters of polyethylene glycol-200 to make a total of 100 milliliters of liquid. Twenty grams of 4,4'-cyclohexylidenebis(2-isopropyl-6-methylphenol) are dispersed in the ethanol-polyethylene glycol–200 mixture and the solution is sterilized. There is thus obtained a composition suitable for administration to mammals by injection for the purpose of lowering abnormally high serum cholesterol levels. Injection of 3 milliliters of the composition supplies 600 milligrams of the active ingredient.

EXAMPLE 6

A mixture consisting of 250 parts of 4,4'-cyclohexylidenebis(2-sec-butylphenol) and 8 parts of wheat starch is mixed with a paste composed of 40 parts of wheat starch and 6 parts of gelatin in 75 parts of water. The mixture is granulated, passed through an eight mesh screen and dried. The granulate is then passed through a twelve mesh screen and mixed well with 13 parts of talc and 4 parts of magnesium stearate. The mixture is compressed into tablets weighing 1.3 grams each. The tablets are scored by known methods and are adapted to be administered orally as a single dosage or as multiple dosages, each comprising a whole tablet or one-half or one-fourth of a single tablet.

What is claimed is:

1. A method useful for reducing cholesterol levels in the blood of mammals, the method comprising administering orally to a mammal having an abnormally high blood serum cholesterol level a member of the group consisting of 4,4'-cyclohexylidenebis(2-isopropylphenol), 4,4'-cyclohexylidenebis(2 - sec - butylphenol), 4,4' - cyclohexylidenebis(2 - tert - butyl - 6 - methylphenol) and 4,4'-cyclohexylidenebis(2-cyclophentylphenol) in a daily amount of from about 20 milligrams to about one gram of compound per kilogram of animal body weight.

2. The method of claim 1 wherein the compound is 4,4'-cyclohexylidenebis(2-sec-butylphenol).

3. The method of claim 1 wherein the compound is 4,4'-cyclohexylidenebis(2-tert-butyl-6-methylphenol).

4. The method of claim 1 wherein the daily dosage is between about 40 and about 400 milligrams per kilogram of animal body weight.

References Cited

UNITED STATES PATENTS

| 3,279,922 | 10/1966 | Jaworski | 99—8X |
| 2,538,725 | 1/1951 | Johnson et al. | 424—346 |
| 2,894,004 | 7/1959 | Dietzler | 260—619X |
| 3,082,188 | 3/1963 | Dietzler et al. | 260—619X |

FOREIGN PATENTS

| 1,088,455 | 10/1967 | Great Britain. | |
| 581,636 | 8/1959 | Canada | 260—619A |

OTHER REFERENCES

Bickoff et al.: J. Am. Oil Soc., vol. 32, pp. 64–68, 1955.

ALBERT T. MEYERS, Primary Examiner

L. SCHENKMAN, Assistant Examiner